US011074417B2

(12) United States Patent
Bhide et al.

(10) Patent No.: US 11,074,417 B2
(45) Date of Patent: Jul. 27, 2021

(54) SUGGESTIONS ON REMOVING COGNITIVE TERMINOLOGY IN NEWS ARTICLES

(71) Applicant: International Business Machines Corporation, Armonk, NY (US)

(72) Inventors: Manish A. Bhide, Hyderabad (IN); Sameep Mehta, New Delhi (IN); Nishtha Madaan, Haryana (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/264,015

(22) Filed: Jan. 31, 2019

(65) Prior Publication Data

US 2020/0250264 A1 Aug. 6, 2020

(51) Int. Cl.
*G06F 40/35* (2020.01)
*G06F 16/9536* (2019.01)
(Continued)

(52) U.S. Cl.
CPC .......... *G06F 40/35* (2020.01); *G06F 16/9536* (2019.01); *G06F 40/169* (2020.01); *G06F 40/289* (2020.01)

(58) Field of Classification Search
CPC ...................................................... G06F 17/00
(Continued)

(56) References Cited

U.S. PATENT DOCUMENTS 8,826,125 B2 9/2014 Chu
9,015,037 B2 4/2015 Myslinski
(Continued)

FOREIGN PATENT DOCUMENTS

WO 1998020428 A 5/1998
WO 2009089116 A2 7/2009

OTHER PUBLICATIONS

Patankar et al.; A Bias Aware News Recommendation System; 2019 IEEE 13th International Conference on Semantic Computing (ICSC); 978-1-5386-6783-5/19/$31.00 © 2019 IEEE (Year: 2019).*
(Continued)

*Primary Examiner* — Bharatkumar S Shah
(74) *Attorney, Agent, or Firm* — Troutman Pepper Hamilton Sanders LLP (57) ABSTRACT

Embodiments provide a computer implemented method in a data processing system comprising a processor and a memory comprising instructions, which are executed by the processor to cause the processor to implement the method of removing a cognitive terminology from a news article at a news portal, the method including: receiving, by the processor, a first news article from a user; configuring, by the processor, a cognitive terminology filter list to add one or more entities and one or more cognitive terminology types associated with each entity in the cognitive terminology filter list; dividing, by the processor, the first news article into a plurality of text segments; identifying, by the processor, one or more key entities and one or more inter-entity relationships of each text segment; detecting, by the processor, one or more cognitive terminologies in the first news article; and providing, by the processor, one or more suggestions to remove the one or more cognitive terminologies.

16 Claims, 5 Drawing Sheets

(51) Int. Cl.
*G06F 40/169* (2020.01)
*G06F 40/289* (2020.01)

(58) Field of Classification Search
USPC .............................................. 704/9
See application file for complete search history.

(56) References Cited

U.S. PATENT DOCUMENTS

| | | |
|---|---|---|
| 9,189,514 B1 | 11/2015 | Myslinksi |
| 9,495,341 B1 | 11/2016 | Vagell et al. |
| 2012/0158726 A1* | 6/2012 | Musgrove ............. G06F 16/353 707/737 |
| 2013/0297546 A1 | 11/2013 | Woods-Holder |
| 2014/0330760 A1* | 11/2014 | Meier .................... G06N 20/00 706/12 |

OTHER PUBLICATIONS

Patankar et al.; A Bias Aware News Recommendation System; 2019 IEEE 13th International Conference on Semantic Computing (ICSC); 978-1-5386-6783-5/19/$31.00 © 2019 IEEE (Year: 2019) (Year: 2019).*

Patankar et al.; A Bias Aware News Recommendation System; 2019 IEEE 13th International Conference on Semantic Computing (ICSC); 978-1-5386-6783-5/19/$31.00 © 2019 IEEE (Year: 2019) (Year: 2019) (Year: 2019).*

Houser, "A New AI "Journalist" is Rewriting the News to Remove Bias," Futurism, Apr. 6, 2018, pp. 1-4.

* cited by examiner

SUGGESTIONS ON REMOVING COGNITIVE TERMINOLOGY IN NEWS ARTICLES

TECHNICAL FIELD

The present disclosure relates generally to a system, method, and computer program product that are used to identify a cognitive terminology in an article, e.g., a news article, prepared by a journalist, and provide suggestions to the journalist on removing the cognitive terminology.

BACKGROUND

News portals are often subject to overrepresentation and underrepresentation biases, often due to unconscious biases of journalists of the news portals. However, the unconscious biases create a perception among readers regarding the potential biases of the news portals. For instance, some web news portals are perceived to be biased in favor of conservative political parties while some others are perceived to be biased in favor of liberal political parties. Thus, there is a need/desire for news portals to keep their news articles unbiased to maintain a perception of neutral reporting.

Currently, an artificial intelligence robot is introduced to attempt to generate unbiased news articles. However, it is impossible to have each individual news article unbiased. Further, the artificial intelligence robot attempts to pull from a statistically significant number of external sources, but neither guides journalists to create unbiased news in terms of representation, language or information, nor helps the journalists maintain an overall unbiased profile for himself/herself, as well as for the news portal as a whole.

SUMMARY

Embodiments provide a computer implemented method in a data processing system comprising a processor and a memory comprising instructions, which are executed by the processor to cause the processor to implement the method of removing a bias from a news article at a news portal, the method comprising: receiving, by the processor, a first news article from a user; configuring, by the processor, a bias filter list to add one or more entities and one or more bias types associated with each entity in the bias filter list; dividing, by the processor, the first news article into a plurality of text segments; identifying, by the processor, one or more key entities and one or more inter-entity relationships of each text segment; detecting, by the processor, one or more biases in the first news article; and providing, by the processor, one or more suggestions to remove the one or more biases.

Embodiments further provide a computer implemented method, further comprising: ignoring, by the processor, a particular bias of the one or more biases if an entity and a bias type associated with the particular bias is included in the bias filter list.

Embodiments further provide a computer implemented method, wherein the step of detecting further comprising: calculating, by the processor, a stance score of each text segment; calculating, by the processor, a sentiment score of each text segment; calculating, by the processor, a tone score of each text segment; obtaining, by the processor, a bias score of each text segment based on the stance score, the sentiment score, and the tone score; and identifying, by the processor, the one or more biases if the bias score of a particular text segment is over a predetermined threshold value.

Embodiments further provide a computer implemented method, wherein the step of obtaining further comprising: averaging, by the processor, the stance score, the sentiment score, the tone score to obtain a bias score of each text segment.

Embodiments further provide a computer implemented method, wherein the step of obtaining further comprising: summing the stance score, the sentiment score, the tone score to obtain a bias score of each text segment.

Embodiments further provide a computer implemented method, further comprising: providing, by the processor, additional suggestions to avoid creating new biases in the first news article.

Embodiments further provide a computer implemented method, further comprising: calculating the stance score, the sentiment score, and the tone score of each text segment based on one or more of the first news article of the user, other news articles created by the user prior to the first news article, other news articles written by other users at the same news portal, and other news articles created by other users at other news portals.

Embodiments further provide a computer implemented method, further comprising: retrieving the other news articles created by the user prior to the first news article, the other news articles written by the other users at the same news portal, and the other news articles created by the other users at the other news portals through a web crawler integrated in a search engine.

Embodiments further provide a computer implemented method, wherein the one or more bias types include one or more of a gender bias, an age bias, a race bias, an ethnicity bias, and a stance bias.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for identifying a cognitive terminology (e.g., bias) in a news article prepared by a journalist, and providing suggestions to the journalist on removing the cognitive terminology implying a bias, are disclosed. With the system, method, and computer program product, a journalist can be guided to create unbiased news (or more unbiased news) using information from one or more of the current news article (in-news), other news articles appearing on the same news portal (cross-news), other news articles appearing on external sources, e.g. on other news portal (cross-portal), and/or news articles created by the journalist prior to the current article (self-profile), thus helping this journalist maintain an overall unbiased profile for himself/herself, as well as an overall unbiased profile for the news portal as a whole.

In an embodiment, the journalist enters a news article including meta-entries. The meta-entries include key entities (e.g., people, places, objects etc.) aimed to be written for in a news article; inter-entity relationships (e.g., Martin Luther King Jr. is related to "born in Atlanta, Ga." and "graduated from Morehouse College"), and other meta terms such as a meta description (an HTML tag to generate a click-through from search engines), keywords etc., of the news article. These meta-entries are extracted from the news article by information extraction (IE). The information extraction is a process of extracting essential elements from structured text or knowledge from unstructured text by identifying references to named entities as well as stated relationships between such entities.

In an embodiment, the journalist writes a news article including one or more words, without any guidance. Then an entity and relationship identification module analyzes the written news article (the written news article can be a complete news article, or can be an uncompleted news article), and identifies the key entities and the inter-entity relationships present in the written news article through the information extraction. In an embodiment, a bias filter list is configured with one or more entities and/or entity relationships, and a particular type of bias. For example, one of entities is Britney Spears, and the stance of Britney Spears is "positive." In the bias filter list, the entity "Britney Spears" and the stance of "positive" are included in the bias filter list, which means that the bias detection module will ignore "Britney Spears" if all the terms in the news article about "Britney Spears" are positive, and will not alert the journalist to this stance bias.

The bias detection module then performs further natural language processing on the written news article, with respect to the extracted entities and entity relationships. The further natural language processing includes analysis on e.g., objectiveness/subjectivity, stance, tone, sentiment, etc. Specifically, the bias detection module detects stance of each text segment (such as sentences, paragraphs etc.) with respect to each entity and each entity relationship (each entity pair) and obtains a stance score for each text segment of the written news article. Further, in an embodiment, the bias detection module detects sentiment of each text segment of the written news article, and assigns a sentiment score to each text segment. Additionally, in an embodiment, the bias detection module detects a tone of each text segment and assigns a tone score to each text segment. The stance score can be calculated with the existing natural language processing techniques, for example, deep learning approaches such as convolutional neural networks (CNN), recurrent neural networks (RNN), long short-term memory (LSTM), Support Vector Machines (SVM), etc. The sentiment score can be calculated with the existing natural language processing techniques, for example, a machine-learning method that applies text-categorization techniques to the subjective portions of a news article. The tone score can be obtained through a linguistic analysis to detect joy, fear, sadness, anger, analytical, confident or tentative tone of the news article. For example, a tone analyzer of IBM Watson™ can be used to obtain a tone score. In an embodiment, the bias detection module can also detect other factors related to a bias in the news article, and calculate a score for each factor.

In an embodiment, the bias detection module performs similar natural language processing on other news articles written by the same journalist. Specifically, all the other news articles written by the same journalist are combined. Subsequently, the bias detection module performs similar natural language processing on the combined news articles, and the similar sets of scores (a set of stance scores, a set of sentiment scores, a set of tone scores, etc.) are computed. In an embodiment, the bias detection module performs similar natural language processing on other news articles written by other journalists for the same news portal, and the similar sets of scores are derived for the other news articles written by other journalists for the same news portal. In an embodiment, the bias detection module performs similar natural language processing on other news articles cross-portals (i.e., news articles on other web news portals). In an embodiment, only news articles of other news portals within the same section are collected and processed. For example, if the written news article of this journalist is within the section of "sports," only news articles of other news portals within the section of "sports" are collected and processed. If the written news article of this journalist is within the section of "entertainment," only news articles of other news portals within the section of "entertainment" are collected and processed. The similar sets of scores are derived for other news articles on other web news portals. The news articles on other web news portals can be retrieved through a search engine, e.g., Bing®, Google®, Yahoo®, etc., using one or more entity names, e.g., "Britney Spears," "Barack Obama" as key words for searching.

After natural language processing, a final bias score of each text segment is calculated based on all the sets of scores (stance scores, sentiment scores, tone scores, etc.) derived from one or more of the current written news article, other news articles written by the same journalist, other news articles written by other journalists for the same news portal, and/or other news articles on other web news portals. In an embodiment, the final bias score of each text segment is calculated by summing all the weighted sets of scores of each text segment. Specifically, stance scores, sentiment scores, tone scores, etc. are assigned with the same weight or different weights. In another embodiment, the final bias score of each text segment is calculated by averaging all the weighted sets of scores of each text segment.

The bias suggestion module is triggered if the final bias score is more than a predetermined threshold value. If the written news article has been completed, a highlight-and-suggest module is triggered (text segments with a bias are highlighted and suggestions on how to address the bias are provided); while if the written news article is uncompleted, a highlight-suggest-and-forward-guide module is triggered (text segments with a bias are highlighted, and suggestions on how to address the bias and on how to draft the uncompleted part of the news article are provided). If a final bias score of a particular text segment is more than a predetermined threshold value, which indicates a potential bias, this particular text segment is highlighted. Similarly, if there are several text segments each having a final bias score over the predetermined threshold value, then all the text segments having a final bias score over the predetermined threshold value will be highlighted. There is at least one bias from a set of undesired biases (including e.g., a gender bias, an age bias, a race bias, an ethnicity bias, and a stance bias, etc.) present in the news article. The text segment(s) can be highlighted in various ways, as long as the journalist can notice the text segment(s) having a potential bias (i.e., the text segment(s) having a final bias score over the predetermined threshold value). For example, the text segment(s) can be highlighted with a different color, a high or low contrast, a high brightness or low brightness. For another example, the text segment(s) can be bolded, underlined, italicized, or enclosed in a rectangular border, etc.

In a specific example, a news article has only positive terms about Britney Spears and no negative terms, leading to a stance bias. However, if "Britney Spears" is protected by a bias filter list (the entity "Britney Spears" and the stance "positive" are configured in the bias filter list), then this bias is ignored. In another news article, similarly, there are only positive terms about "Celine Dion" and no negative terms, also leading to a stance bias. If "Celine Dion" is not protected by such a bias filter list (the entity "Celine Dion" and the stance "positive" are not configured in the bias filter list), then a stance bias is detected for "Celine Dion" in this news article and presented to the journalist. In an embodiment, the context of the bias, such as a bias in the context of the current news article, a bias in the context of the journalist's all-articles, a bias in the context of the same web news portal as a whole, or a bias in the context of other web news portals as a whole, etc. is also presented to the journalist.

The bias suggestion module provides suggestions for the highlighted text segment(s) to remove a bias (e.g., stance distribution bias). If the written news article is uncompleted, the bias suggestion module also provides a forward guidance on how to write the subsequent part of the news article to avoid a bias. In an embodiment, the suggestions can be drawn from internet web pages through a web crawler integrated in a search engine, using terms that are opposite/de-biasing in nature. Specifically, in an example, suggestions can be obtained from other news articles either from the same news portal or other news portals. These news articles can have similar keyword semantics, e.g., word embedding, and provide negative opinions about "Celine Dion" (the current news article only has positive terms about "Celine Dion"). Word embedding is the collective name for a set of language modeling and feature learning techniques in natural language processing (NLP) where words or phrases from the vocabulary are mapped to vectors of real numbers. In another example, negative opinions or criticism about a camera that is described positively in the current news article can be retrieved and suggested to the journalist. In another embodiment, the suggestions can also be generated using generative networks, such as sequence-to-sequence generators, generative adversarial networks (GANs), Markovian text generators, etc.

Figure 1:
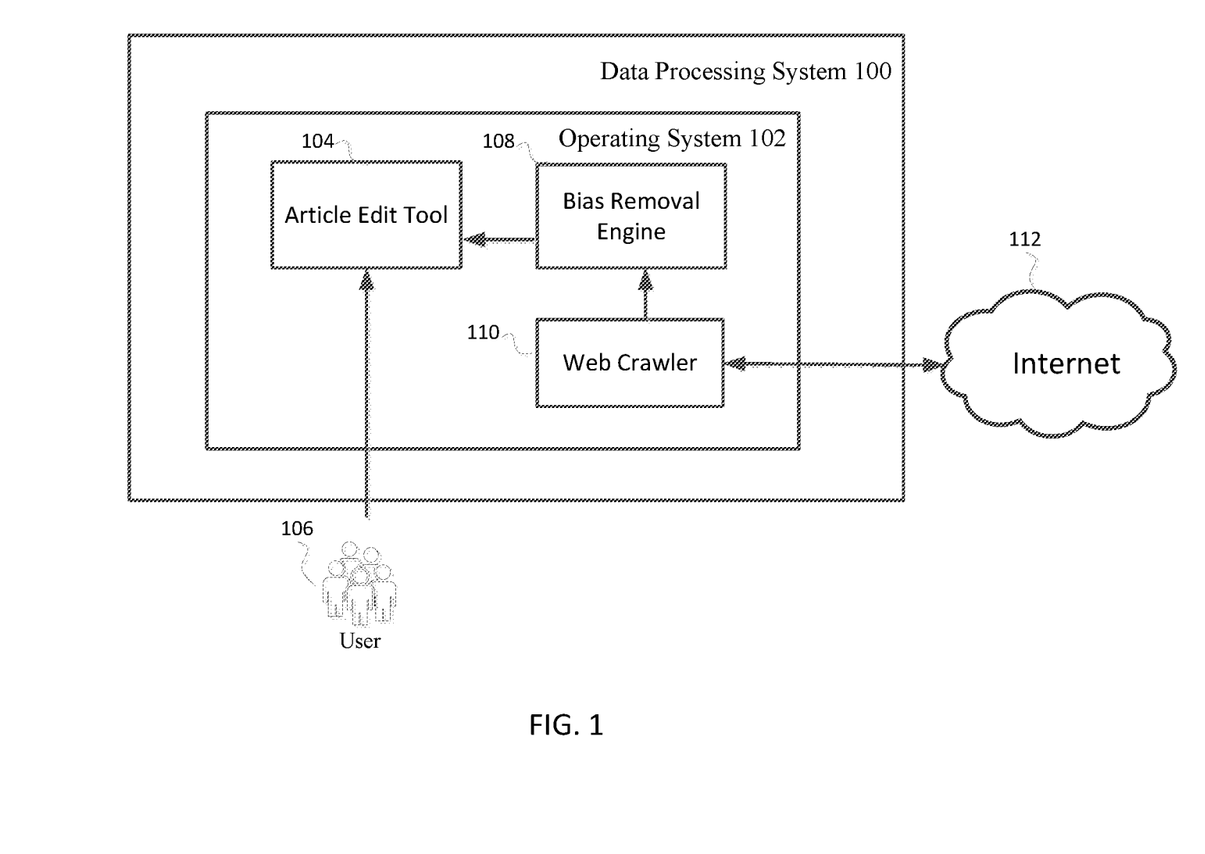
FIG. 1 depicts a block diagram of an example data processing system in which aspects of the illustrative embodiments are implemented.

FIG. 1 depicts a block diagram of an example data processing system 100 in which aspects of the illustrative embodiments are implemented. As shown in FIG. 1, data processing system 100 is an example of a computer, such as a server or client, in which computer usable code or instructions implementing the process for illustrative embodiments of the present invention are located. In one embodiment, the data processing system 100 represents a computing device, which implements operating system 102. In some embodiments, the operating system 102 can be Windows, Unix system or Unix-like operating systems, such as AIX, A/UX, HP-UX, IRIX, Linux, Minix, Ultrix, Xenix, Xinu, XNU, and the like.

In the depicted example, the article edit tool 104, the bias removal engine 108 and the web crawler 110 run on the operating system 102. The user 106, e.g. a journalist, writes a news article through the article edit tool 104. The web crawler 110 is integrated in a search engine and communicates with the internet 112. The web crawler 110 can obtain huge news article contents across the internet 112 and provide the related news article contents to the bias removal engine 108. The bias removal engine 108 can detect a potential bias in the news article on the article edit tool 104, alert the user 106 to the bias and provide suggestions on how to remove the bias.

Figure 2:
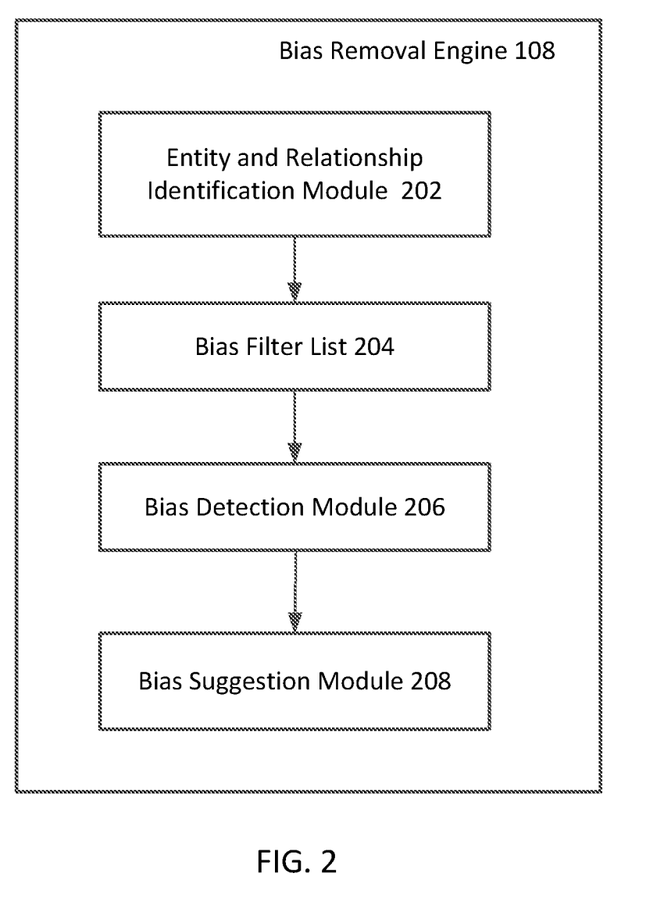
FIG. 2 depicts a block diagram of an example bias removal engine 108, according to some embodiments described herein.

FIG. 2 depicts a block diagram of an example bias removal engine 108, according to some embodiments described herein. As shown in FIG. 2, in an embodiment, the bias removal engine 108 includes the entity and relationship identification module 202, the bias filter list 204, the bias detection module 206, and the bias suggestion module 208. The entity and relationship identification module 202 analyzes the written news article input by the user 106, divides the written news article into short text segments, and identifies the key entities and the inter-entity relationships present in the written news article through information extraction. The bias filter list 204 can be configured by the user 106. Specifically, the user can input entities and bias types (a gender bias, an age bias, a race bias, an ethnicity bias, or a stance bias) to be filtered out. The bias detection module 206 can then ignore biases related to the entities and the bias types provided in the bias filter list 204. The bias detection module 206 can detect one or more biases in the written news article. Specifically, the bias detection module 206 calculates a set of scores for each text segment, e.g., a stance score, a sentiment score, a tone score, and/or other related scores, and then obtains a bias score for each text segment based on the set of scores. Specifically, in an embodiment, the bias score of each text segment can be calculated by summing the set of scores. Each score in the set may be assigned with different weights. In another embodiment, the bias score of each text segment can be calculated by averaging the set of scores. If the bias score of each text segment is over a predetermined threshold value, the bias suggestion module 208 highlights one or more text segments having a bias score higher than the predetermined threshold value, and provides one or more suggestions on how to remove each bias. The suggestions can be obtained across the internet 112 through the web crawler 110. The suggestions can also be generated using generative networks.

Figure 3:
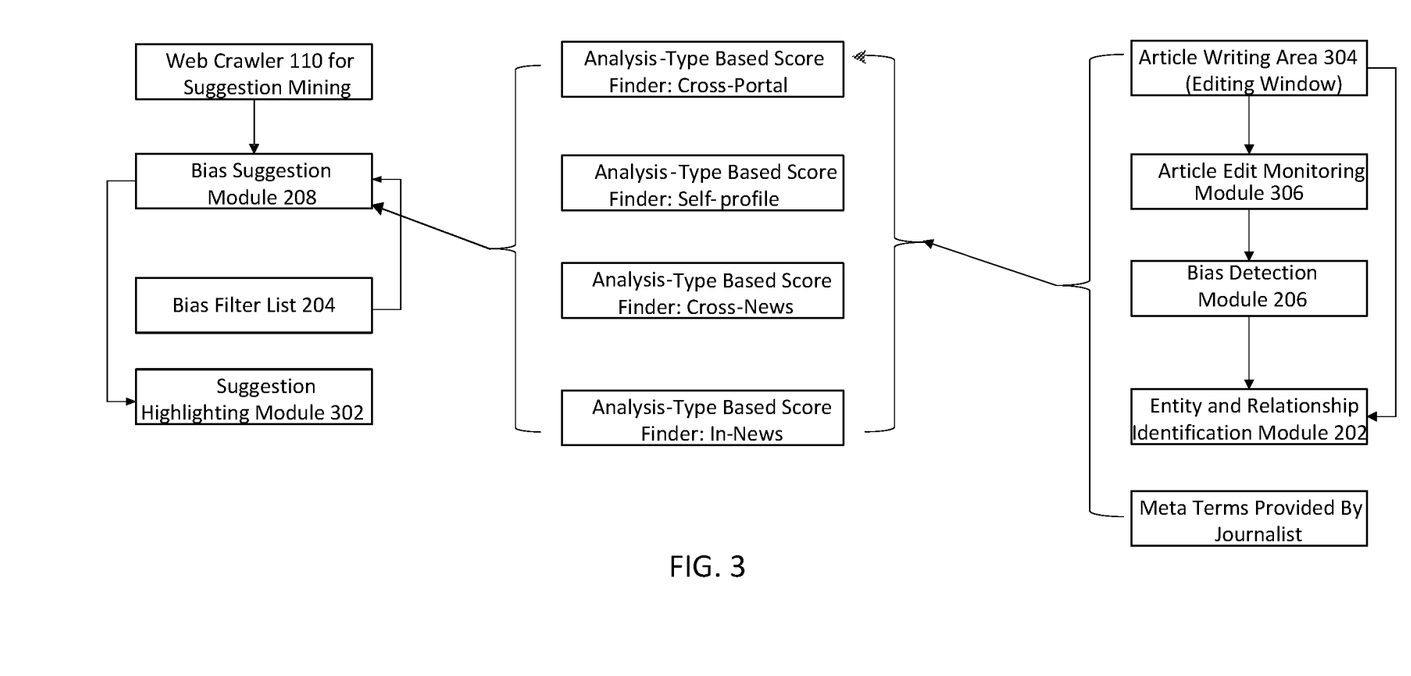
FIG. 3 depicts a block diagram of an example system architecture in which aspects of the illustrative embodiments are implemented.

FIG. 3 depicts a block diagram of an example system architecture in which aspects of the illustrative embodiments are implemented. As shown in FIG. 3, the article edit tool 104 includes the article writing area 304 and the article edit monitoring module 306. The user 106, e.g. a journalist writes a news article in the article writing area 304. The news article includes meta terms. Entities and inter-entity relationships of the news article can be extracted by the entity and relationship identification module 202. The article edit monitoring module 306 detects whether the news article is complete, if the news article is complete, the bias detection module 206 is triggered. The bias detection module 206 can calculate scores for the written news article based on cross-portal, self-profile, cross-news and in-news articles. If the bias detection module 206 detects any biases, the bias suggestion module 208 provides suggestions on how to remove the biases. The web crawler 110 can be used to obtain suggestions across the internet 112. The bias suggestion module 208 also considers configuration of the bias filter list 204 when providing suggestions. The suggestion highlighting module 302 highlights the part of the written news article having a bias and the suggestions provided by the bias suggestion module 208.

Figure 4:
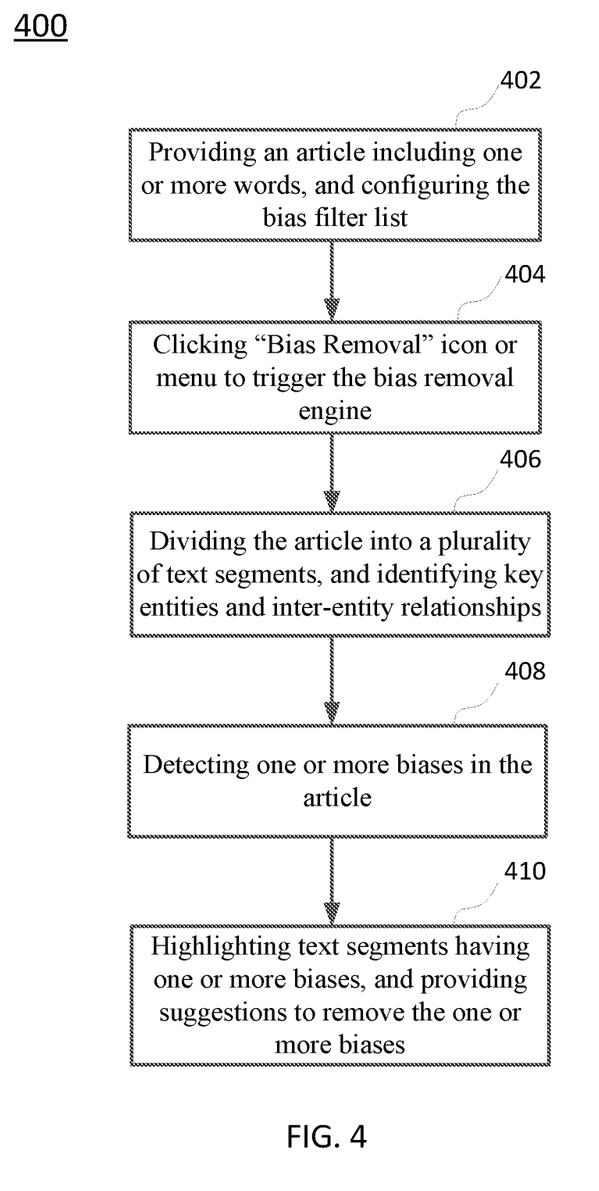
FIG. 4 is a flowchart illustrating a method 400 of removing a bias from a news article, according to embodiments herein.

FIG. 4 is a flowchart illustrating a method 400 of removing a bias from a news article, according to embodiments herein. At step 402, the user 106 writes a news article including one or more words. The user 106 also configures the bias filter list 204 with one or more entities and one or more bias types associated with each entity, so that the bias filter list 204 can filter these configured entities and bias types out later. At step 404, if the user 106 clicks "Bias Removal" icon or menu, the bias removal engine 108 is triggered. At step 406, the entity and relationship identification module 202 divides the written news article into a plurality of text segments, identifies the key entities and the inter-entity relationships present in each text segment through information extraction. At step 408, the bias detection module 206 can detect one or more biases in the written news article. However, the bias detection module 206 will ignore biases related to the entities and the bias types provided in the bias filter list 204. In an embodiment, in addition to the current news article written by the user, the bias detection module 206 also consider other news articles created by the same user prior to the current news article, other news articles created by other users appearing at the same news portal, and other news articles created by other users appearing at other news portals, etc. for bias detection. These news articles can be retrieved through the web crawler 110 integrated in a search engine. A set of scores of different factors are calculated for each text segment of the written news article, in view of all the news articles collected across portals from different users. A final score of each text segment of the written news article is then calculated based on the set of scores. At step 410, if the final score of one or more text segments are over a predetermined threshold value, the bias suggestion module 208 highlights the one or more text segments having a final score over the predetermined threshold value, and provides a suggestion on how to remove the one or more biases in the written news article. The suggestion can be, for example, "[Y]ou have written ten advantages of this camera, here are five disadvantages of this camera for your reference." In this example, the five advantages of the camera can be retrieved across the internet 112 through the web crawler 110 integrated in a search engine.

Figure 5:
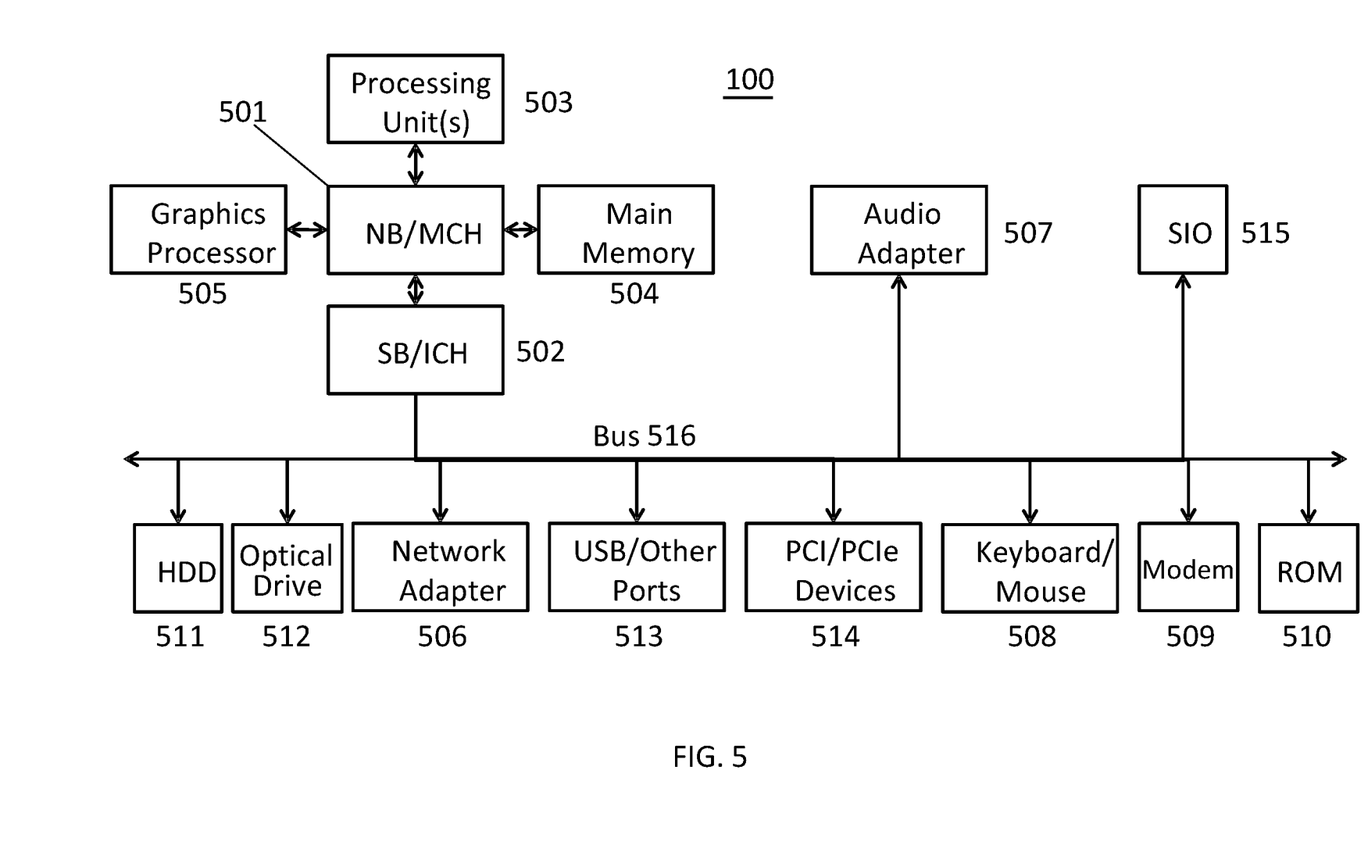
FIG. 5 is a block diagram of another example data processing system 100 in which aspects of the illustrative embodiments may be implemented.

FIG. 5 is a block diagram of an example data processing system 100 in which aspects of the illustrative embodiments may be implemented. The data processing system 100 is an example of a computer, such as a server or client, in which computer usable code or instructions implementing the process for illustrative embodiments of the present invention are located. In one embodiment, FIG. 5 may represent a server computing device.

In the depicted example, data processing system 100 may employ a hub architecture including a north bridge and memory controller hub (NB/MCH) 501 and south bridge and input/output (I/O) controller hub (SB/ICH) 502. Processing unit 503, main memory 504, and graphics processor 505 may be connected to the NB/MCH 501. Graphics processor 505 may be connected to the NB/MCH 501 through an accelerated graphics port (AGP) (not shown in FIG. 5).

In the depicted example, the network adapter 506 connects to the SB/ICH 502. The audio adapter 507, keyboard and mouse adapter 508, modem 509, read only memory (ROM) 510, hard disk drive (HDD) 511, optical drive (CD or DVD) 512, universal serial bus (USB) ports and other communication ports 513, and the PCI/PCIe devices 514 may connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 may use an integrated drive electronics (IDE) or serial advanced technology attachment (SATA) interface. The super I/O (SIO) device 515 may be connected to the SB/ICH 502.

An operating system may run on processing unit 503. The operating system could coordinate and provide control of various components within the data processing system 100. As a client, the operating system may be a commercially available operating system. An object-oriented programming system, such as the Java™ programming system, may run in conjunction with the operating system and provide calls to the operating system from the object-oriented programs or applications executing on data processing system 100. As a server, the data processing system 100 may be an IBM® eServer™ System P® running the Advanced Interactive Executive operating system or the Linux operating system. The data processing system 100 may be a symmetric multiprocessor (SMP) system that may include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the generation system may be performed by the processing unit 503 using computer usable program code, which may be located in a memory such as, for example, main memory 504, ROM 510, or in one or more peripheral devices.

A bus system 516 may be comprised of one or more busses. The bus system 516 may be implemented using any type of communication fabric or architecture that may provide for a transfer of data between different components or devices attached to the fabric or architecture. A communication unit such as the modem 509 or network adapter 506 may include one or more devices that may be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 100 may take the form of a number of different data processing systems, including but not limited to, client computing devices, server computing devices, tablet computers, laptop computers, telephone or other communication devices, personal digital assistants, and the like. Essentially, the data processing system 100 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement the method of removing a bias from a news article at a news portal, the method comprising:
    receiving, by the processor, a first news article from a user;
    configuring, by the processor, a bias filter list to add one or more entities and a stance associated with each entity in the bias filter list, wherein the stance is "positive" or "negative";
    dividing, by the processor, the first news article into a plurality of text segments;
    identifying, by the processor, one or more key entities and one or more inter-entity relationships of each text segment;
    detecting, by the processor, one or more biases in the first news article;
    ignoring, by the processor, a stance bias of the one or more biases if a particular entity and a stance associated with the particular entity are included in the bias filter list; and
    providing, by the processor, one or more suggestions to remove the one or more biases.

2. The method as recited in claim 1, wherein the step of detecting further comprising:
    calculating, by the processor, a stance score of each text segment;
    calculating, by the processor, a sentiment score of each text segment;
    calculating, by the processor, a tone score of each text segment;
    obtaining, by the processor, a bias score of each text segment based on the stance score, the sentiment score, and the tone score; and
    identifying, by the processor, the one or more biases if the bias score of a particular text segment is over a predetermined threshold value.

3. The method as recited in claim 2, wherein the step of obtaining further comprising:
    summing, by the processor, the stance score, the sentiment score, and the tone score to obtain a bias score of each text segment, wherein the stance score, the sentiment score, and the tone score are each assigned with a different weight.

4. The method as recited in claim 2, further comprising:
    calculating the stance score, the sentiment score, and the tone score of each text segment based on one or more of the first news article of the user, other news articles created by the user prior to the first news article, other news articles written by other users at the same news portal, and other news articles created by other users at other news portals.

5. The method as recited in claim 4, further comprising:
    retrieving the other news articles created by the user prior to the first news article, the other news articles written by the other users at the same news portal, and the other news articles created by the other users at the other news portals, through a web crawler integrated in a search engine.

6. The method as recited in claim 1, further comprising:
    providing, by the processor, additional suggestions to avoid creating new biases in the first news article.

7. A computer program product for removing a bias from a news article at a news portal, the computer program product comprising a computer readable storage medium having program instructions embodied therewith, the program instructions executable by a processor to cause the processor to:
    receive a first news article from a user;
    configure a bias filter list to add one or more entities and a stance associated with each entity in the bias filter list, wherein the stance is "positive" or "negative";
    divide the first news article into a plurality of text segments;
    identify one or more key entities and one or more inter-entity relationships of each text segment;
    detect one or more biases in the first news article;

ignore a stance bias of the one or more biases if a particular entity and a stance associated with the particular entity are included in the bias filter list; and provide one or more suggestions to remove the one or more biases.

8. The computer program product as recited in claim 7, wherein the processor is further caused to:

calculate a stance score of each text segment;

calculate a sentiment score of each text segment;

calculate a tone score of each text segment;

obtain a bias score of each text segment based on the stance score, the sentiment score, and the tone score; and identify the one or more biases if the bias score of a particular text segment is over a predetermined threshold value.

9. The computer program product as recited in claim 8, wherein the processor is further caused to:

calculate the stance score, the sentiment score, and the tone score of each text segment based on one or more of the first news article of the user, other news articles created by the user prior to the first news article, other news articles written by other users at the same news portal, and other news articles created by other users at other news portals.

10. The computer program product as recited in claim 9, wherein the processor is further caused to:

retrieve the other news articles created by the user prior to the first news article, the other news articles written by the other users at the same news portal, and the other news articles created by the other users at the other news portals, through a web crawler integrated in a search engine.

11. The computer program product as recited in claim 7, wherein the processor is further caused to:

provide the one or more suggestions based on a plurality of news articles from an internet through a web crawler integrated in a search engine.

12. The computer program product as recited in claim 7, wherein the processor is further caused to:

provide the one or more suggestions using a generative network.

13. A system for removing a bias from a news article at a news portal, comprising:

a processor configured to:

receive a first news article from a user;

configure a bias filter list to add one or more entities and a stance associated with each entity in the bias filter list, wherein the stance is "positive" or "negative";

divide the first news article into a plurality of text segments;

identify one or more key entities and one or more inter-entity relationships of each text segment;

detect one or more biases in the first news article;

ignore a stance bias of the one or more biases if a particular entity and a stance associated with the particular entity are included in the bias filter list; and provide to the user one or more suggestions to remove the one or more biases.

14. The system as recited in claim 13, the processor is further configured to:

calculate a stance score of each text segment;

calculate a sentiment score of each text segment;

calculate a tone score of each text segment;

obtain a bias score of each text segment based on the stance score, the sentiment score, and the tone score; and identify the one or more biases if the bias score of a particular text segment is over a predetermined threshold value.

15. The system as recited in claim 14, wherein the processor is further configured to:

calculate the stance score, the sentiment score, and the tone score of each text segment based on one or more of the first news article of the user, other news articles created by the user prior to the first news article, other news articles written by other users at the same news portal, and other news articles created by other users at other news portals.

16. The system as recited in claim 15, wherein the processor is further configured to:

provide the one or more suggestions based on a plurality of news articles from an internet through a web crawler integrated in a search engine.

* * * * *